(12) United States Patent
Firner

(10) Patent No.: US 11,449,709 B2
(45) Date of Patent: Sep. 20, 2022

(54) DOMAIN RESTRICTION OF NEURAL NETWORKS THROUGH SYNTHETIC DATA PRE-TRAINING

(71) Applicant: NVIDIA Corporation, Santa Clara, CA (US)

(72) Inventor: Bernhard Firner, Highland Park, NJ (US)

(73) Assignee: NVIDIA Corporation, Santa Clara, CA (US)

( * ) Notice: Subject to any disclaimer, the term of this patent is extended or adjusted under 35 U.S.C. 154(b) by 213 days.

(21) Appl. No.: 16/874,003

(22) Filed: May 14, 2020

(65) Prior Publication Data

US 2021/0042575 A1 Feb. 11, 2021

Related U.S. Application Data

(60) Provisional application No. 62/884,267, filed on Aug. 8, 2019.

(51) Int. Cl.
*G06K 9/62* (2022.01)
*G06N 3/08* (2006.01)
(Continued)

(52) U.S. Cl.
CPC ......... *G06K 9/6256* (2013.01); *G05D 1/0088* (2013.01); *G05D 1/0221* (2013.01); *G05D 1/0251* (2013.01); *G06K 9/6232* (2013.01); *G06K 9/6267* (2013.01); *G06N 3/04* (2013.01); *G06N 3/08* (2013.01); *G05D 2201/0213* (2013.01)

(58) Field of Classification Search
CPC .. G06K 9/6256; G06K 9/6232; G06K 9/6267; G06K 9/00637; G06K 9/00791; G06K 9/6271; G05D 1/0088; G05D 1/0221; G05D 1/0251; G05D 2201/02; G06N 3/04; G06N 3/08; G06N 3/0454; G06N 3/084; G01S 13/582; G01S 7/417; G01S 13/89; G01S 13/931; G01S 17/894; G01S 17/931; G08G 1/166; G08G 1/167
USPC ....................................................... 382/156
See application file for complete search history.

(56) References Cited

U.S. PATENT DOCUMENTS 10,468,062 B1* 11/2019 Levinson .............. G01S 13/867
10,885,698 B2 1/2021 Muthler et al.
(Continued)

OTHER PUBLICATIONS

Jaderberg, M., Simonyan, K., Vedaldi, A., & Zisserman, A. (2014). Synthetic data and ai lilicial neural networks for natural scene text recognition. arXiv preprint arXiv:1406.2227.
(Continued)

*Primary Examiner* — Juan A Torres
(74) *Attorney, Agent, or Firm* — Taylor English Duma LLP

(57) ABSTRACT

A neural network is trained to focus on a domain of interest. For example, in a pre-training phase, the neural network in trained using synthetic training data, which is configured to omit or limit content less relevant to the domain of interest, by updating parameters of the neural network to improve the accuracy of predictions. In a subsequent training phase, the pre-trained neural network is trained using real-world training data by updating only a first subset of the parameters associated with feature extraction, while a second subset of the parameters more associated with policies remains fixed.

20 Claims, 11 Drawing Sheets

(51) Int. Cl.
*G06N 3/04* (2006.01)
*G05D 1/00* (2006.01)
*G05D 1/02* (2020.01)

(56) References Cited

U.S. PATENT DOCUMENTS

| | | | |
|---|---|---|---|
| 11,151,447 B1* | 10/2021 | Chen | G06N 3/08 |
| 2019/0156151 A1* | 5/2019 | Wrenninge | G06K 9/6256 |
| 2019/0205667 A1* | 7/2019 | Avidan | G06N 3/08 |
| 2020/0294201 A1* | 9/2020 | Planche | G06T 7/55 |
| 2020/0326717 A1* | 10/2020 | Chen | G06K 9/6256 |

OTHER PUBLICATIONS

Jaderberg, M., Simonyan, K., Vedaldi, A., & Zisserman, A. (2016). Reading text in the wild with convolutional neural networks. International Journal of Computer Vision, 116(1), 1-20.

Le, T. A., Baydin, A. G., Zinkov, R., & Wood, F. (May 2017). Using synthetic data to train neural networks is model-based reasoning. In 2017 International Joint Conference on Neural Networks (IJCNN) (pp. 3514-3521). IEEE.

Mahmood, F., Chen, R., Sudarsky, S., Yu, D., & Durr, N. J. (2018). Deep learning with cinematic rendering: fine-tuning deep neural networks using photorealistic medical images. Physics in Medicine & Biology, 63(18), 185012.

Barth, R., IJsselmuiden, J., Hemming, J., & Van Henten, E. J. (2019). Synthetic bootstrapping of convolutional neural networks for semantic plant part segmentation. Computers and Electronics in Agriculture, 161, 291-304.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

ISO 26262, "Road vehicle—Functional safety," International Standard for Functional Safety of Electronic System, Retrieved from Internet URL: https://en.wikipedia.org/wiki/ISO_26262, accessed on Sep. 13, 2021, 8 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

* cited by examiner

DOMAIN RESTRICTION OF NEURAL NETWORKS THROUGH SYNTHETIC DATA PRE-TRAINING

CROSS-REFERENCE TO RELATED APPLICATIONS

This application claims the benefit of U.S. Provisional Application No. 62/884,267, filed on Aug. 8, 2019, which is hereby incorporated by reference in its entirety.

BACKGROUND

Accurate image processing (e.g., for recognition and classification) by a machine (e.g., computer programmed with a trained neural network) is important in various contexts. For example, autonomous vehicles, drones, or vehicles equipped with advanced driver assistance systems (ADAS) may analyze image data in real time (e.g., image of roadway from a camera) to formulate driving operations (e.g., turn steering device left, activate brake system, etc.). A neural network may be trained to interpret image data for various purposes. For example, when processing image data, a neural network may be trained to focus on a particular category or domain of image content (e.g., road curvature), such that it is desirable for the network to learn image features closely related to that domain of interest (e.g., perimeter lines of the road and lane markings).

A neural network may be trained to interpret image data by inputting batches of image training data to the neural network over a number of epochs, and parameters (e.g., weights) of the neural network may be modified after each batch to adjust the accuracy of predictions. Real-world image data may be used as training data in order to train the neural network to interpret real-world image data. However, in environments that are highly variable (e.g., roadway conditions) a relatively large set of training data is typically needed in order for the neural network to accurately interpret for a selected output(s). For example, generating a data set of real-world image data that is large enough, and variable enough for proper training, is often resource intensive. To illustrate the foregoing, in a vehicular context, generating the data set may include a person driving a vehicle in various environments and under various conditions to capture real-world image data for training, which is costly and takes a significant amount of time.

In addition to being costly and time consuming to generate, using real-world image training data may present other issues. For instance, real-world images often represent both content that causes a neural network to learn image features closely related to the domain of interest ("in-domain content") and content that causes the neural network to learn image features less closely related to the domain of interest ("out-of-domain content or artifacts"). For example, training data used to train a neural network to analyze road curvature may include real-world images of roads having varying degrees of curvature (e.g., curve left, curve right, straight, etc. as depicted by perimeter lines of the roadway), and these same real-world images may also depict angled headlight illumination paths (e.g., where a headlight automatically adjusts an angle to follow a road curvature). In this case, the angled headlight illumination paths may be considered out-of-domain artifacts, and the neural network may learn to focus more on the angled headlight illumination path than the perimeter lines of the roadway. If such a trained neural network is deployed with an autonomous vehicle that does not automatically adjust its headlight angle to follow a road curvature (e.g., the headlights only point straight), then the autonomous vehicle might fail to detect an upcoming curve and drive straight (e.g., off the road), instead of following the road.

Synthetic image data may be used as image training data, such as computer-generated images and/or renderings of a simulated three-dimensional (3D) environment. Generating simulated image training data may be less labor and time intensive than generating real-world image training data. Additionally, it may be somewhat easier to control for out-of-domain artifacts by generating simplified representations of the real-world. However, a neural network trained only on simulated image training data may not perform well in a real-world deployment, as it is often challenging to generate simulated image training data that captures the high variability and detail included in real-world image data.

A conventional approach to training a neural network may combine synthetic training data with real-world training data to form a training data set. In particular, synthetic training data has been used to increase the size of the training data set by augmenting a small amount of real-world data with the synthetic data. Such an approach may account for situations where generating enough real-world training data is difficult or costly, and may result in trained neural networks that operate somewhat better than when only synthetic training data is used. However, there are many applications (e.g., image processing applications) where replicating the variety of real-world data may not be possible with synthetic data generation. In these cases a large amount of real data is still required. Additionally, using these approaches, a neural network may still inadvertently learn undesirable correlations between a domain of interest (e.g., roadway curvature) and out-of-domain artifacts included among the real-world training data.

SUMMARY

Embodiments of the present disclosure relate to applying domain restriction to neural networks through synthetic data pre-training. Systems and methods are disclosed that train a neural network using synthetic training data (e.g., using exclusively synthetic image training data) prior to training the neural network in a subsequent training phase using other training data (e.g., synthetic training data and/or real-world training data).

In contrast to conventional approaches, in the subsequent training phase (after the pre-training phase using synthetic training data) one or more lower-level feature layers (e.g., all lower-level feature layers) of the network that are more closely associated with feature extraction may be updated (e.g., by updating weights or other parameters), while higher-level feature layers of the network that are more associated with policies (e.g., all higher-level feature layers) are fixed at the thereto trained values. This may allow the neural network to adapt to a real-world domain while rejecting out-of-domain artifacts since the policy part of the network can only use in-domain features that were learned during a prior phase. As such, the neural network may be less likely to learn out-of-domain features, as they can be better controlled for using the synthetic data. In addition, costs associated with generated training data may be reduced by using at least some synthetic training data in addition to the real-world training data.

BRIEF DESCRIPTION OF THE DRAWINGS

The present systems and methods for domain restriction of neural networks through synthetic data pre-training are described in detail below with reference to the attached drawing figures, wherein.

DETAILED DESCRIPTION

Figure 2:
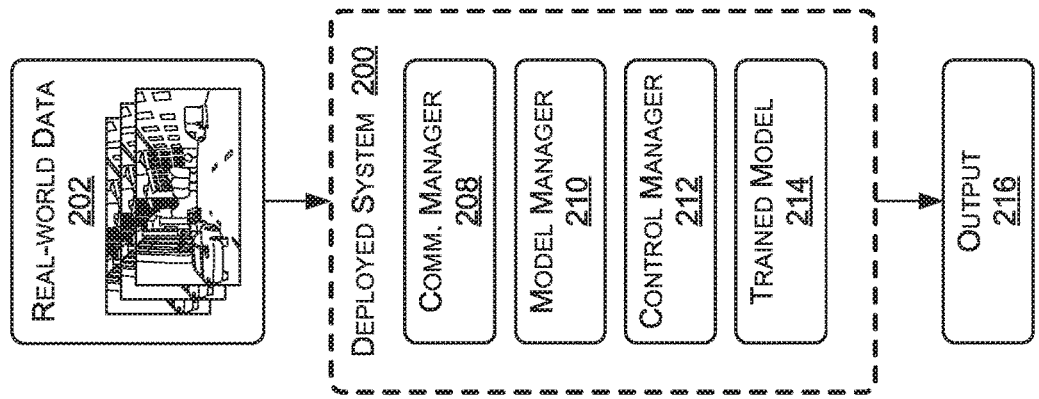
FIG. 2 is an illustration including an example deployed system, including a model trained using the training system of FIG. 1, in accordance with some embodiments of the present disclosure.

Systems and methods are disclosed related to domain restriction of neural networks through synthetic data pre-training. The present disclosure may be described with respect to an example autonomous vehicle, an example of which is described in more detail herein with respect to FIGS. 7A-7D. Although the present disclosure primarily provides examples using autonomous vehicles, other types of objects may be controlled using a neural network pre-trained and trained in accordance with this disclosure, such as drones or vehicles equipped with advanced driver assistance systems (ADAS).

A neural network may be trained to interpret sensor data (e.g., image data) for various purposes. For example, a neural network may be trained to focus on a particular category or domain (e.g., road curvature), for the network to learn features closely related to that domain (e.g., perimeter lines of the road and lane markings). Some sensor data inputted to a trained neural network may include both content that is more closely related to the domain of interest and content or artifacts less closely related to the domain of interest. For example, a neural network deployed in an autonomous vehicle and configured to focus on road curvature may receive some sensor data with content relevant to road curvature (e.g., image data representing lane markings) and some sensor data with content or artifacts less relevant to road curvature (e.g., image data representing road signs, headlight-status sensor data indicating headlight position, turn-signal sensor data indicating turn signal status, etc.). In that case, the neural network may more accurately focus on road curvature when it learns (e.g., through training) to ignore the content or artifacts that are less relevant to road curvature.

The present disclosure is related to a neural network that has been trained to ignore, or pay less attention to, content or artifacts less closely related to a domain of interest. For example, the neural network—e.g., convolutional neural network (CNN)—may include lower-level layers (e.g., convolutional layers) more closely associated with feature extraction and higher-level layers (e.g., fully connected layers) more closely associated with policies. Aspects of the present disclosure include pre-training the neural network using synthetic image training data, which is configured to include content more closely related to a domain of interest and to not include content or artifacts less closely related to the domain of interest. During the pre-training both the lower-level layers and the higher-level layers may be allowed to learn by updating parameters (e.g., weights). Subsequent to the pre-training, the pre-trained neural network is trained using synthetic image training data and/or real-world image training data, which may include both content more closely related to the domain of interest and content less closely related to the domain of interest. During the training, in contrast to conventional approaches, the lower-level layers of the pre-trained neural network are permitted to learn by updating parameters, whereas the higher-level layers of the pre-trained neural network are fixed and not permitted to update.

Among other benefits, costs associated with generating training data may be reduced by achieving accurately trained neural networks using synthetic data, which may be less costly to generate than real-world data. Furthermore, because real-world data is still employed subsequent to the pre-training, the synthetic data used in the pre-training may include less detail and definition to represent desired in-domain content in a generic manner, and may be less resource intensive to generate, store, and process. In addition, a trained neural network may be less likely to correlate less closely related content with a domain of interest. That is, by initially training with the synthetic data that has more closely related content and omits or reduces less closely related content, the network may focus on more important polices arising from the content.

Disclosed embodiments may be used to train a neural network for image processing applications. According to embodiments, because the convolutional layers associated with feature extraction are allowed to learn with real-world image data—while the fully connected layers are fixed and not allowed to learn—the neural network may adapt to a real-world image domain while learning to reject out-of-domain artifacts, since the policy part of the network may be restricted to using features learned during synthetic training. In this manner, a semantic domain may be specified through the synthetic data used in a training step, while still allowing the training process to learn real-world features to match those semantics.

Figure 1:
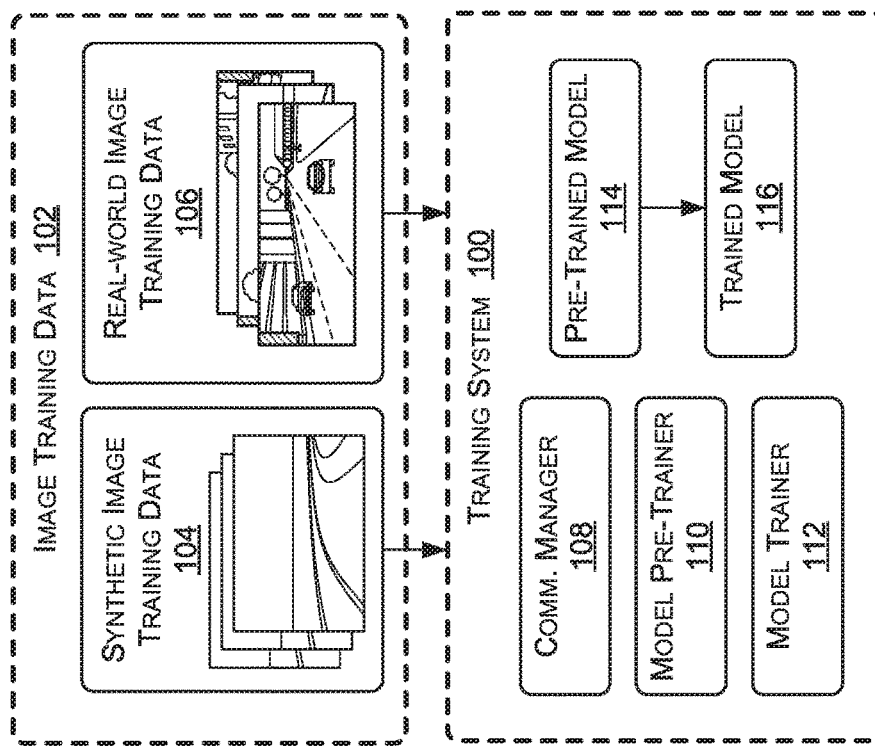
FIG. 1 is an illustration including an example training system for pre-training and training a model, in accordance with some embodiments of the present disclosure.

With reference to FIG. 1, FIG. 1 is an example training system 100 for training a neural network to process images (e.g., for object detection), in accordance with some embodiments of the present disclosure. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

At a high level, the training system 100 may receive image training data 102 and use the image training data 102 to train a model 116 (e.g., CNN) to learn image features closely related to a domain of interest, while reducing sensitivity to content or artifacts less related to the domain of interest. The trained model 116 may then be deployed in the deployed system 200 depicted in FIG. 2 (e.g., as trained model 214) and used to process data (e.g., real-world data 202).

As used in this disclosure a "domain" or "domain of interest" may refer to a target output of a neural network (e.g., subject about which the neural network outputs a prediction or confidence score). For example, in a neural network deployed in an autonomous vehicle, a domain of interest may include road curvature, in which case the neural network (e.g., object detector) may be configured to receive sensor data (e.g., image data) and output a predicted road curvature. Aspects of this disclosure include training a neural network to learn "in-domain features," which may refer to features of content in sensor data more closely related to or representative of a domain of interest, and ignore "out-of-domain artifacts," which may refer to features of content or artifacts in sensor data that may be less closely related to or representative of the domain of interest.

Figure 3:
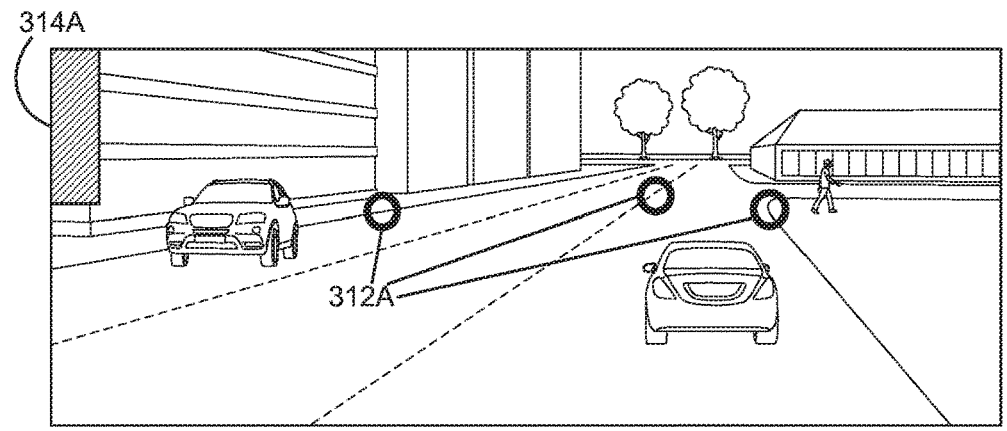
FIG. 3 is an illustration including examples of images with out-of-domain artifacts, in accordance with some embodiments of the present disclosure.
Figure 3:
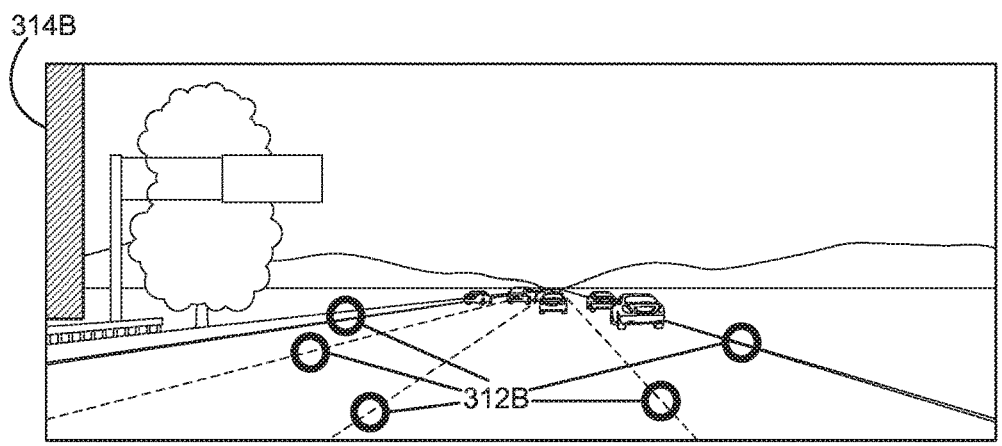
Figure 3:
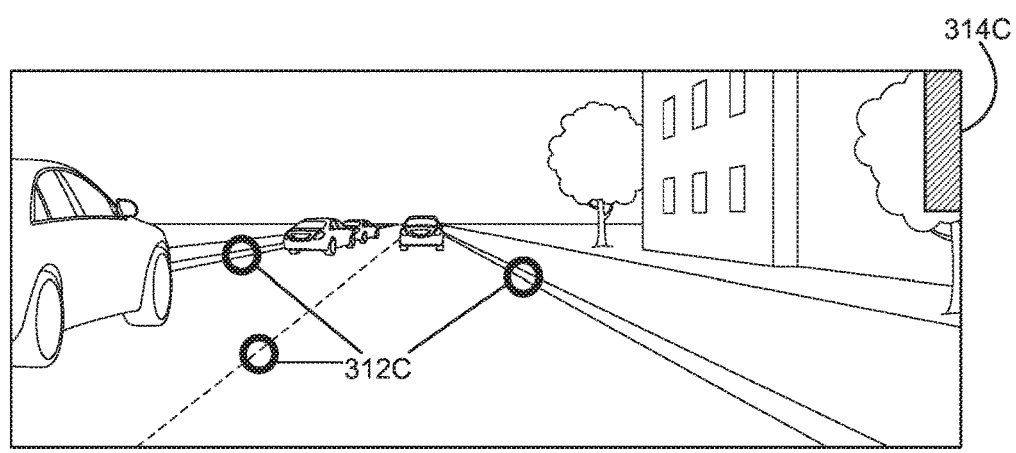

Referring to FIG. 3, FIG. 3 illustrates images providing examples of in-domain features more closely related to the road curvature domain and out-of-domain features less closely related to the road curvature domain. For example, each image includes in-domain features 312A, 312B, and 312C more relevant to road curvature, including lines (e.g., straight or curved) representing curbs, shoulders, lanes, roadway perimeter edges, etc. In addition, each image includes out-of-domain artifacts 314A, 314B, and 314C less relevant to road curvature. In the images, the out-of-domain artifacts 314A, 314B, and 314C are illustrated as hatch-filled rectangles that may represent glare, image lighting conditions, headlight position, turn-signal status, brake-system status, or other visual elements that could be learned as relevant to road curvature by a neural network, but are not actually representative of road curvature.

A neural network may be trained to interpret image data (e.g., predict road curvature) by inputting the as part of a batch (or multiple batches), in which case the neural network might learn an association between predicted road curvature and the out-of-domain artifacts 314A, 314B, and 314C (in addition to, or in lieu of, any association between the predicted road curvature and the in-domain features 312A, 312B, and 312C). If the trained neural network is then deployed in a system that does not generate the out-of-domain artifacts 314A, 314B, and 314C, or that generates other out-of-domain artifacts, then the trained neural network may have lower accuracy. Although road curvature is described as an example of a domain with respect to FIG. 3, various other domains are possible in other aspects of this disclosure (e.g., roadway intersection, parking spot location, vehicle trajectory, hill ascent or hill descent, etc.).

Referring back to FIG. 1, the training system 100 is configured to learn image features closely related to a domain of interest (e.g., 312A, 312B, and 312C), while reducing sensitivity to content or artifacts less related to the domain of interest (e.g., 314A, 314B, and 314C). In one or more embodiments, the training system 100 includes, for example, a communications manager 108, a model pre-trainer 110, a pre-trained model 114, a model trainer 112, and a trained model 116.

As an overview, the communications manager 108 may be configured to manage communications received by training system 100 (e.g., comprising the image training data 102) and/or provided by the training system 100 (e.g., the trained model 116). In addition, the communications manager 108 may be configured to manage communications exchanged among components of the training system 100. For example, the model pre-trainer 110 may be configured to receive synthetic image training data 104 of the image training data 102 and perform pre-training of the pre-trained model 114, and the model trainer 112 may be configured to receive real-world image training data 106 of the image training data 102 and perform training of the pre-trained model 114 to result in the trained model 116.

The model pre-trainer 110 used to train the pre-trained model 114 may include various operations. For example, pre-training the pre-trained model 114 may include inputting batches of the synthetic image training data 104 to the pre-trained model 114 over a number of epochs, and parameters (e.g., weights) of the pre-trained model 114 may be modified after each batch to adjust the accuracy of predictions. In one aspect, modifying parameters of the pre-trained model 114 may include changing (e.g., updating weights) both lower-level feature layers of the pre-trained model 114 (e.g., more closely associated with feature extraction) and higher-level feature layers of the pre-trained model 114 (e.g., more closely associated with policies).

In other aspects, the model trainer 112 training the pre-trained model 114 to result in the trained model 116 may also include various operations. For example, training the pre-trained model 114 may include updating the pre-trained model 114 by inputting batches of the real-world image training data 106 to the pre-trained model 114 over a number of epochs, and parameters (e.g., weights) may be modified after each batch to adjust the accuracy of predictions. In some aspects, and in contrast to conventional approaches, modifying parameters during the training (e.g., subsequent to the pre-training) includes allowing lower-level feature layers of the pre-trained model 114 to be changed (e.g., by updating weights), while higher-level features layers of the pre-trained model 114 remain fixed. By permitting the layers more closely associated with feature extraction to update while fixing the higher layers associated with policies, the trained model 116 may be adapted to a real-world domain while rejecting out-of-domain content since the policy part of the trained model 116 can only use in-domain features that were learned during a prior phase. As such, the trained model 116 may be less likely to learn out-of-domain features, since the out-of-domain features can be better controlled for using the synthetic image training data 104.

The trained model 116 may then be deployed in the deployed system 200 as the trained model 214. In addition to the trained model 214, the deployed system includes, by way of example, a communications manager 208, a model manager 210, and a control manager 212. Similar to the communications manager 108, the communications manager 208 may be configured to manage communications received by the deployed system 200 (e.g., comprising the real-world data 202) and/or provided by the deployed system 200 (e.g., output 216). In addition, the communications manager 208 may be configured to manage communications exchanged among components of the deployed system 200. For example, the model manager 210 may be configured to receive the real-world data 202 and input the real-world data 202 to the trained model 214. In addition, the model manager 210 may be configured to transmit an output from the trained model 214 to a downstream component such as the control manager 212.

The control manager 212 may be configured to control one or more operations of one or more machines based at least in part on the output from the trained model 214. The control manager 212 may comprise a vehicle control module and/or a post-processing module and may transmit an output 216 for controlling the machine, such as control signals for vehicle actuation of brakes, acceleration, braking, steering, windshield wipers, etc.

Figure 4:
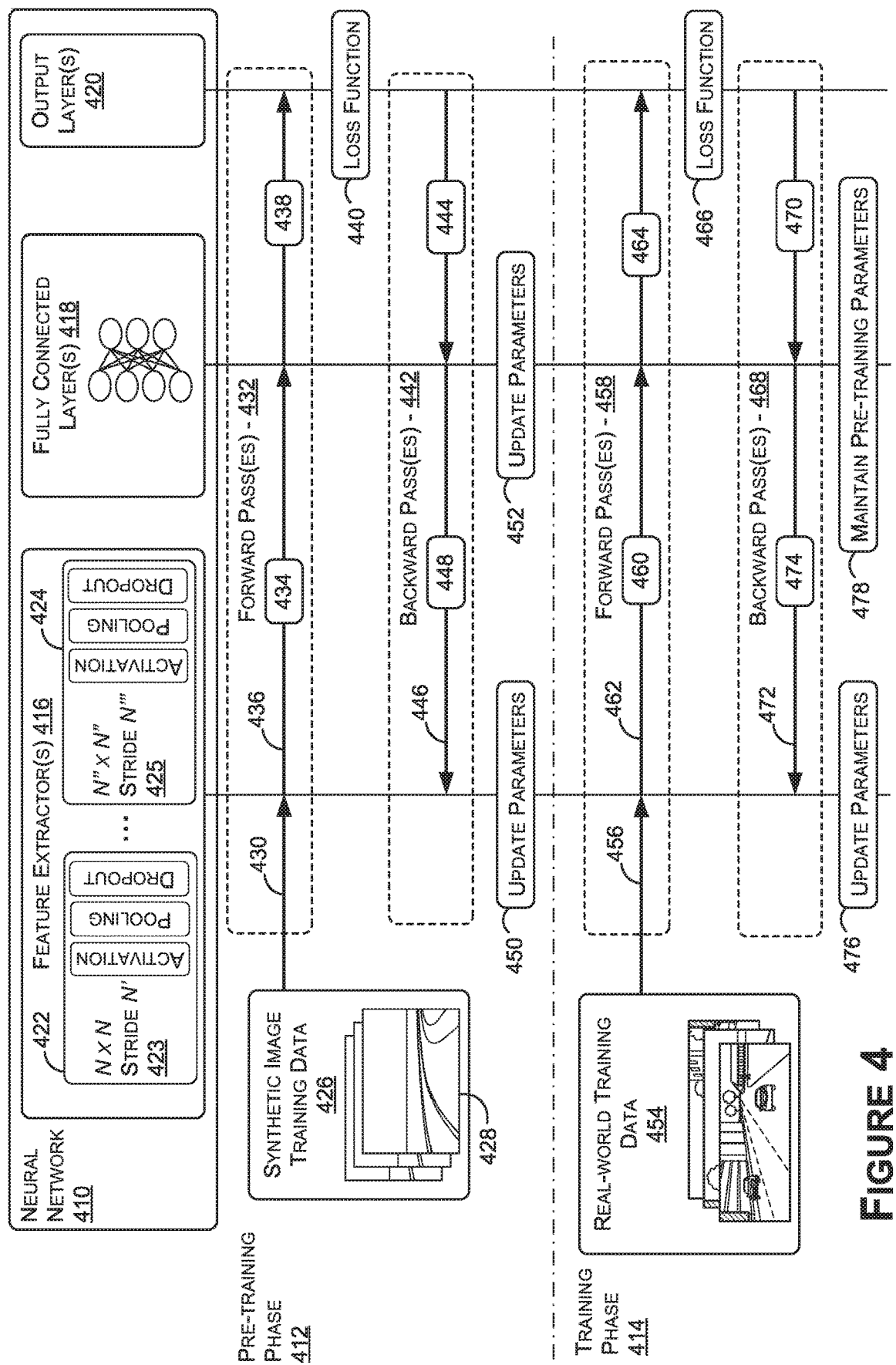
FIG. 4 is an illustration including a convolutional neural network (CNN) and information exchanged during a pre-training phase and a training phase, in accordance with some embodiments of the present disclosure.

Referring now to FIG. 4, FIG. 4 illustrates an example neural network 410, as well as arrows representing a series of operations that may be executed during a pre-training phase 412 and a training phase 414, in accordance with an aspect of the present disclosure. The neural network 410 is an example of a neural network that, after the pre-training phase 412, may comprise the pre-trained model 114, and after the training phase 414, may comprise the trained model(s) 116 and/or 214. The neural network 410 includes, as an example, a convolutional neural network (CNN) having feature extractor(s) 416, fully connected layers 418, and an output layer 420. The neural network 410 may also have an input layer (not depicted) that holds values associated with image training data. For example, the input layer may hold values representative of the raw pixel values of the image(s) input to the convolutional network 616 as a volume (e.g., a width, a height, and color channels (e.g., RGB), such as 32×32×3).

In FIG. 4 the feature extractor(s) 416 include a convolutional unit 422 having a convolutional layer 423 and a convolutional unit 424 having a convolutional layer 425, but the feature extractor(s) 416 may include more convolutional units or fewer convolutional units, and each convolutional unit may include more convolutional layers. Each of the convolutional layers 423 and 425 may compute the output of neurons that are connected to local regions in an input layer (e.g., the input layer), each computing a dot product between their weights and a small region they are connected to in the input volume. A result of the convolutional layers 423 and 425 may be another volume, with one of the dimensions based at least in part on the number of filters applied (e.g., the width, the height, and the number of filters, such as 32×32×12, if 12 were the number of filters). For example, filters applied by each convolutional layer may have various sizes, and each may have a different stride. Depicted in FIG. 4, the convolutional layer 423 includes the filter N×N with stride N', and the convolutional layer 425 includes the filter N"×N" with stride N'". These filters may have the same size with different strides, different sizes with different strides, and same sizes with a same stride. For example, the convolutional layer 423 may include a 5×5 filter with stride 2, and the convolutional layer 425 may include a 3×3 filter with stride 1.

Convolutional unit(s) 422 and 424 may include an activation layer, such as a Rectified Linear Unit (ReLU) layer. The ReLU layer(s) may apply an elementwise activation function, such as the max (0, x), thresholding at zero, for example. The resulting volume of a ReLU layer may be the same as the volume of the input of the ReLU layer.

In another aspect, convolutional unit(s) 422 and 424 may include a pooling layer (e.g., batch norm, max pooling, etc.). The pooling layer may perform a down sampling operation along the spatial dimensions (e.g., the height and the width), which may result in a smaller volume than the input of the pooling layer (e.g., 16×16×12 from the 32×32×12 input volume). Convolutional units 422 and 424 may also include a dropout or regularization layer.

In FIG. 4, one or more of the layers of the neural network 410 may also include the fully connected layer(s) 418, and the output of the feature extractor(s) 416 may be input to the fully connected layer(s) 418. Each neuron in the fully connected layer(s) may be connected to each of the neurons in the previous volume. The fully connected layer may compute class scores, and the resulting volume may be 1×1×number of classes.

Although input layers, convolutional layers, pooling layers, activation layers, dropout layers, fully connected layers, and output layers are discussed herein with respect to the neural network 410, this is not intended to be limiting. For example, additional or alternative layers may be included in the neural network, such as normalization layers, SoftMax layers, and/or other layer types. Further, the order and number of layers of the neural network 410 is not limited to any one architecture.

In addition, some of the layers may include parameters (e.g., weights), such as the convolutional layers and the fully connected layers, while others may not, such as the activation layers and pooling layers. In some examples, the parameters may be learned by the neural network 410 during training, and an aspect of the present disclosure includes the pre-training phase 412 and the training phase 414.

The pre-training phase 412 may include inputting batches of synthetic image training data 426 (e.g., only synthetic image training data) to the neural network 410 over a number of epochs, and parameters (e.g., weights) of the neural network 410 may be modified after each batch to adjust the accuracy of predictions. In accordance with an aspect of the present disclosure, the synthetic image training data 426 includes content representing in-domain features relevant to a domain of interest and limits or omits out-of-domain artifacts. In some instances, the synthetic image training data 426 may include relatively low fidelity images manually or automatically configured to include in-domain features while omitting out-of-domain artifacts. In one aspect, the synthetic image training data 426 includes simulated, computer-generated images representing a field of view of a virtual camera capturing a virtual or simulated environment (e.g., virtual roadway), and the virtual environment may be designed to include in-domain features and exclude out-of-domain features. For example, the image 428 may be an example of synthetic image training data including in-domain features (e.g., lines representing road perimeter edges and lanes) relevant to a domain of interest (e.g., roadway curvature) and omitting out-of-domain artifacts (e.g., other image content omitted from the image 428). In some instances, a computer may automatically generate synthetic training data, such as from a three-dimensional (3D) representation of the virtual environment having simulated 3D objects. In other instances, a computer may be used to manually generate synthetic training data, such as by a person using drawing software or word-processing software to manually generate synthetic training data using software drawing tools or software text tools. In addition, synthetic training data may be generated by manually drawing or writing on a physical paper and converting the drawing to a digital format, such as by scanning or using a camera to record a digital image.

In the pre-training phase 412, the synthetic image training data 426 may be inputted 430 to the feature extractor(s) 416 (e.g., to the convolutional layers(s) 423 and 425) in a forward pass 432, in which the output 434 of the feature extractor(s) 416 is input 436 to the fully connected layer(s) 418. The fully connected layer(s) 418 may then provide an output 438 to the output layer 420. A loss function may then be calculated 440 (e.g., using ground-truth data) to evaluate the accuracy of the output from the output layer 420. In some instances, a backward pass 442 or back propagation may be completed by inputting first data 444 to the fully connected layer(s) 418, which outputs 446 second data 448 to the convolutional layer(s) of the feature extractor 416. After the backward pass 442 the parameters (e.g., weights) of the convolutional layer(s) 423 and 425 (and possibly other layers of the convolutional units 422 and 424) may be updated 450, and the parameters (e.g., weights) of the fully connected layers 418 may be updated 452.

FIG. 4 illustrates the backward pass(es) 442 in one aspect of the present disclosure, and in other aspects, the pre-training phase 412 may update parameters of the feature extractor(s) 416 and the fully connected layer(s) 418 after the loss function is calculated 440 without executing a backward pass. In some instances, the pre-training phase 412 may be deemed completed when the loss function satisfies a criteria (e.g., the loss function is minimized or other criteria indicative of a fully trained network), at which time the neural network 410 may be a pre-trained neural network (e.g., pre-trained model 114). By updating parameters of both the lower-level layers more closely associated with feature extraction and the higher-level layers more closely associated with policies, the pre-trained neural network may learn both feature extraction and policy application relevant to the domain of interest.

In accordance with another aspect of the present disclosure, subsequent to the pre-training phase 412, the pre-trained neural network is trained in the training phase 414. The training phase 414 may include inputting batches of real-world training data 454 (e.g., at least real-world training data, possibly in addition to other training data) to the pre-trained neural network 410. Furthermore, in accordance with an aspect of the present disclosure, the real-world training data 454 may include both in-domain features relevant to the domain of interest and out-of-domain artifacts. For example, the real-world training data 454 may include real-world images representing a real-world environment captured in a field of view of a camera on a vehicle. As such, the real-world training data 454 may include image content (e.g., 312A, 312B, and 312C) relevant to a domain of interest and may also include out-of-domain artifacts (e.g., 314A, 314B, and 314C). The out-of-domain artifacts may include data generated from a variety of different sensors, such as images from a camera that represent out-of-domain image content and/or other sensor data of a vehicle representing other conditions of the vehicle (e.g., headlight position, turn signal status, brake-system status, etc.). In addition, the training phase 414 may include inputting other types of training data and/or augmented image data (e.g., rotated, cropped, shifted, etc.) or otherwise altered versions of real-world sensor data and/or images.

In the training phase 414, the real-world training data 454 may be inputted 456 to the feature extractor(s) 416 (e.g., to the convolutional layers 423 and 425) in a forward pass 458, in which the output 460 of the feature extractor(s) 416 is input 462 to the fully connected layer(s) 418. The fully connected layer(s) 418 may then provide an output 464 to the output layer 420. A loss function may then be calculated 466 (e.g., using ground-truth data) to evaluate the accuracy of an output from the output layer 420.

In some instances, one or more backward passes 468 or back propagation may be completed by inputting first data 470 to the fully connected layer(s) 418, which outputs 472 second data 474 to the feature extractor(s) 416. After the backward pass 468, some parameters of the neural network 410 may be updated, whereas other parameters of the neural network (e.g., parameters learned during the pre-training phase 412) may remain fixed. For example, in some instances, parameters of one or more lower-level layers are updated, and parameters of one or more higher-level layers are fixed. The separation between the lower-level layers that are updated and the higher-level layers that are fixed may vary depending on the neural network and the task (e.g., focus or domain) being trained. For example, in some cases, the separation may fall directly after the last convolutional unit and before the first fully connected layer. Referring to FIG. 4, the parameters (e.g., weights) of the convolutional layer(s) 423 and 425 (e.g., and possibly other layers of the convolutional unit(s) 422 and 424) may be updated 476, while the fully connected layers 418 remain fixed (e.g., maintain pre-training parameters 478) such that the parameters (e.g., weights and/or biases) of the fully connected layers(s) 418 learned during the pre-training phase 412 are maintained. In other cases, a separation may occur within the feature extractor(s) 416, such that parameters of some earlier convolutional units (e.g., 423) are updated, whereas parameters of later convolutional units (e.g., 425) and the fully connected layer(s) 416 remain fixed. In another example, the separation may occur within the fully connected layer(s) 418, in which case parameters of the feature extractor(s) 416 and one or more earlier fully connected layers are updated, while later fully connected layers remain fixed.

FIG. 4 illustrates the backward pass(es) 458 in one aspect of the present disclosure, and in other aspects, the training phase 414 may update parameters of only the feature extractor(s) 416 after the loss function (e.g., the same or different as the loss function(s) of the pre-training phase 412) is calculated 466 without executing a backward pass. In some instances, the training phase 414 may be deemed completed when the loss function satisfies a criteria (e.g., the loss function is minimized or other criteria indicative of a fully trained network which may be the same or different than those used for the pre-training phase 412), at which time the neural network 410 may be a trained neural network (e.g., the trained model 116 of the training system 100) and may be deployed in a deployed system (e.g., the trained model 214 in the deployed system 200).

Executing the pre-training phase and the training phase 414 may allow the neural network 410 to adapt to a real-world domain of interest while rejecting out-of-domain artifacts since the policy part of the neural network (e.g., the fully connected layer(s) 418) can only use in-domain features that were learned during the pre-training phase 412. As such, the neural network 410 may be less likely to learn out-of-domain features, since they can be better controlled for using the synthetic data (e.g., the out-of-domain features can be omitted from, or limited in, a simulated environment).

The neural network 410 may include any number of columns and/or branches. For example, the feature extractor(s) 416 may include one or more neural columns, although a single neural column is shown. The various neural columns may be trained and/or pre-trained (in the pre-training phase 412 and the training phase 414) on the same inputs, different inputs, and/or inputs that were processed in different ways. In examples where the feature extractor(s) 416 includes multiple neural columns and/or feature extractors, pre-training parameters may be maintained in the training phase 414 for all or some of the columns and/or feature extractors.

Figure 5:
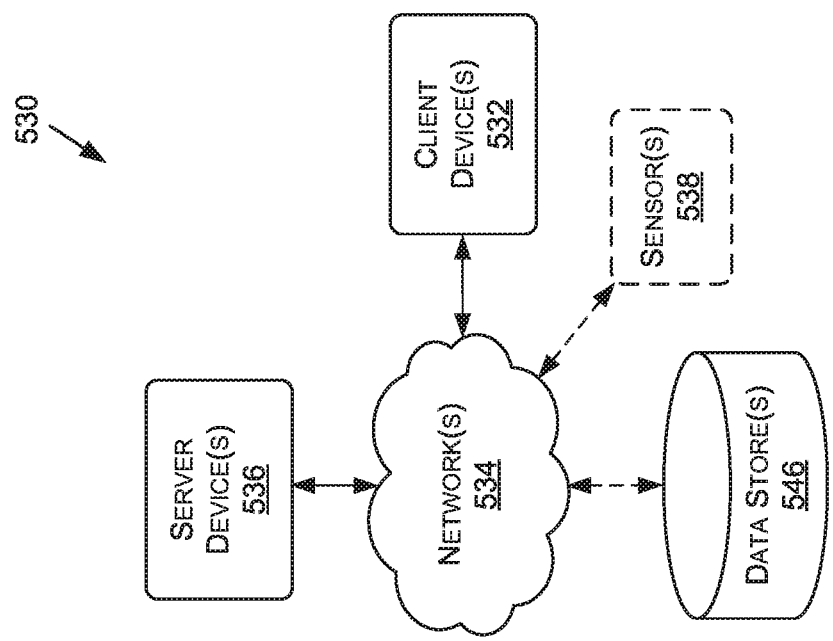
FIG. 5 is an illustration of an example operating environment in which a training system or deployed system may operate, in accordance with some embodiments of the present disclosure.

The deployed system 200 (with the trained model 214 having been trained with the pre-training phase 412 and the training phase 414) may be implemented in an example operating environment 530 of FIG. 5, in accordance with some embodiments of the present disclosure. Among other components not illustrated, the operating environment 530 includes a client device(s) 532, a network(s) 534, a server device(s) 536, a sensor(s) 538, and a data store(s) 546. It should be understood that operating environment 530 shown in FIG. 5 is an example of one suitable operating environment. Each of the components shown in FIG. 5 may be implemented via any type of computing device, such as one or more of computing device 800 described in connection with FIG. 8, for example. These components may communicate with each other via the network 534, which may be wired, wireless, or both. The network 534 may include multiple networks, or a network of networks, but is shown in simple form so as not to obscure aspects of the present disclosure. By way of example, the network 534 may include one or more wide area networks (WANs), one or more local area networks (LANs), one or more public networks such as the Internet, and/or one or more private networks. Where the network 534 includes a wireless telecommunications network, components such as a base station, a communications tower, or even access points (as well as other components) may provide wireless connectivity. In any example, at least one network 534 may correspond to the network(s) 790 of FIG. 7D, described further below.

It should be understood that any number of the client devices 532, the server devices 536, the sensors 538, and the data stores 546 may be employed within the operating environment 530 within the scope of the present disclosure. Each may be configured as a single device or multiple devices cooperating in a distributed environment.

Figure 8:
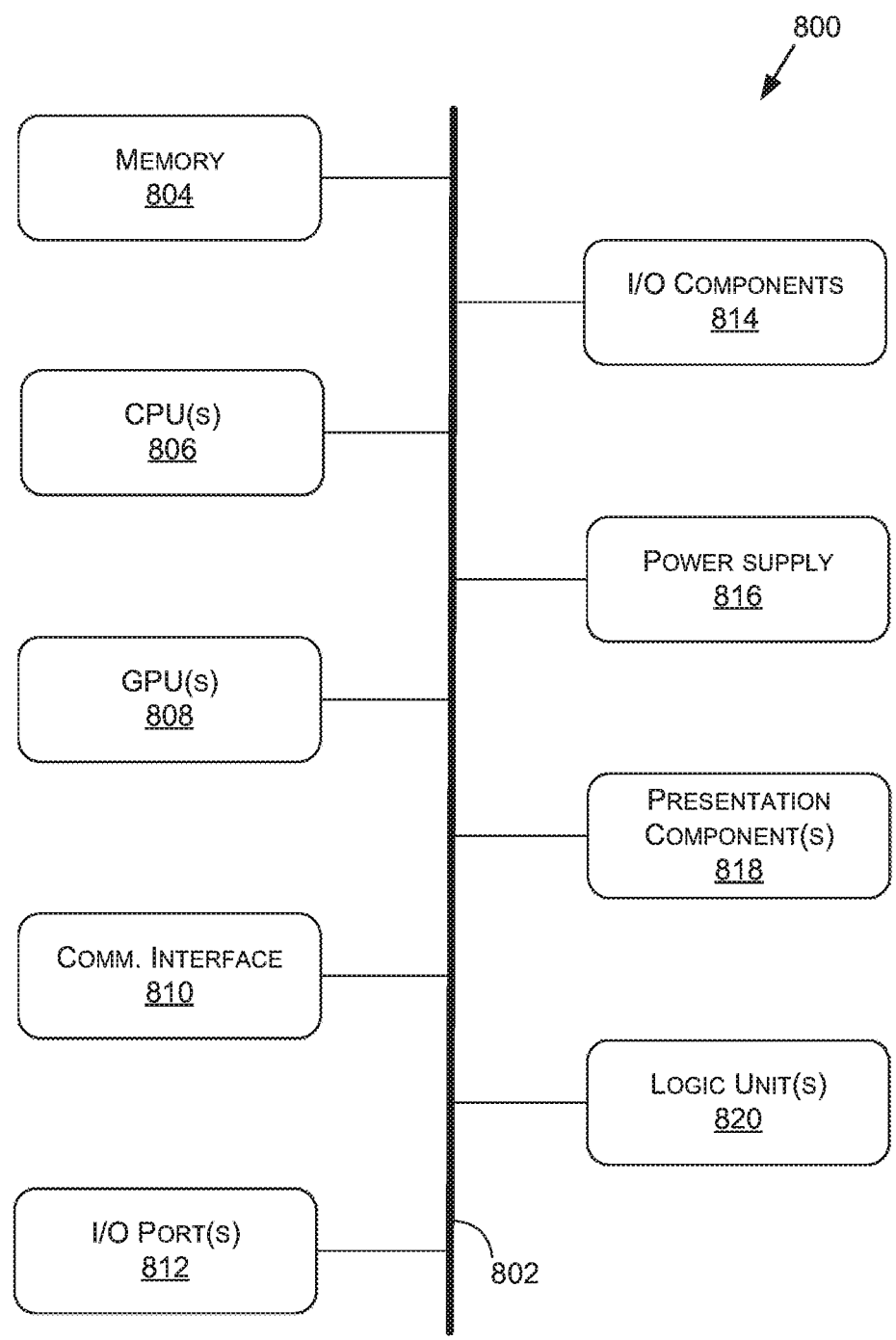
FIG. 8 is a block diagram of an example computing device suitable for use in implementing some embodiments of the present disclosure.

The client device(s) 532 may include at least some of the components, features, and functionality of the example computing device 800 described herein with respect to FIG. 8. By way of example and not limitation, a client device 532 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. In any example, at least one client device 532 may be part of a vehicle, such as the vehicle 700 of FIGS. 12A-12D, described in further detail herein.

The client device(s) 532 may include one or more processors, and one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the deployed system 200 of FIG. 2.

The server device(s) 136 may also include one or more processors, and one or more computer-readable media. The computer-readable media includes computer-readable instructions executable by the one or more processors. The instructions may, when executed by the one or more processors, cause the one or more processors to perform any combination and/or portion of the methods described herein and/or implement any portion of the functionality of the deployed system 200 of FIG. 2. In any example, at least one server device 536 may correspond to the server(s) 778 of FIG. 7D, described in further detail herein.

The data store(s) 546 may comprise one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the deployed system 200 of FIG. 2. The data store(s) 546 (or computer data storage) is depicted as a single component, but may be embodied as one or more data stores (e.g., databases) and may be at least partially in the cloud. One or more of the data store(s) 546 may correspond to one or more of the data stores of FIG. 7C.

Although depicted external to the server device(s) 536 and the client device(s) 532, the data store(s) 546 may be at least partially embodied on any combination of the server device(s) 536 and/or the client device(s) 532 (e.g., as memory 804 (FIG. 8)). For example, some information may be stored on a client device(s) 532, and other and/or duplicate information may be stored externally (e.g., on a server device(s) 536). Thus, it should be appreciated that information in the data store(s) 546 may be distributed in any suitable manner across one or more data stores for storage (which may be hosted externally). For example, the data store(s) 546 may comprise at least some of the one or more computer-readable media of the server device(s) 536 and/or at least some of the one or more computer-readable media of the client device(s) 532.

The sensor(s) 538 comprise at least one sensor capable of generating sensor data representative of at least some aspect of an environment. For example, the sensor(s) 538 may generate the real-world data 202 of FIG. 2. The sensor(s) 538 may comprise any combination of a global navigation satellite systems (GNSS) sensor(s) (e.g., Global Positioning System (GPS) sensor(s)), RADAR sensor(s), ultrasonic sensor(s), LIDAR sensor(s), inertial measurement unit (IMU) sensor(s) (e.g., accelerometer(s), gyroscope(s), magnetic compass(es), magnetometer(s), etc.), microphone(s), stereo camera(s), wide-view camera(s) (e.g., fisheye cameras), infrared camera(s), surround camera(s)(e.g., 360 degree cameras), long-range and/or mid-range camera(s), speed sensor(s) (e.g., for measuring the speed of the vehicle 700), vibration sensor(s), steering sensor(s), brake sensor(s) (e.g., as part of the brake sensor system), and/or other sensor types.

Figure 6A:
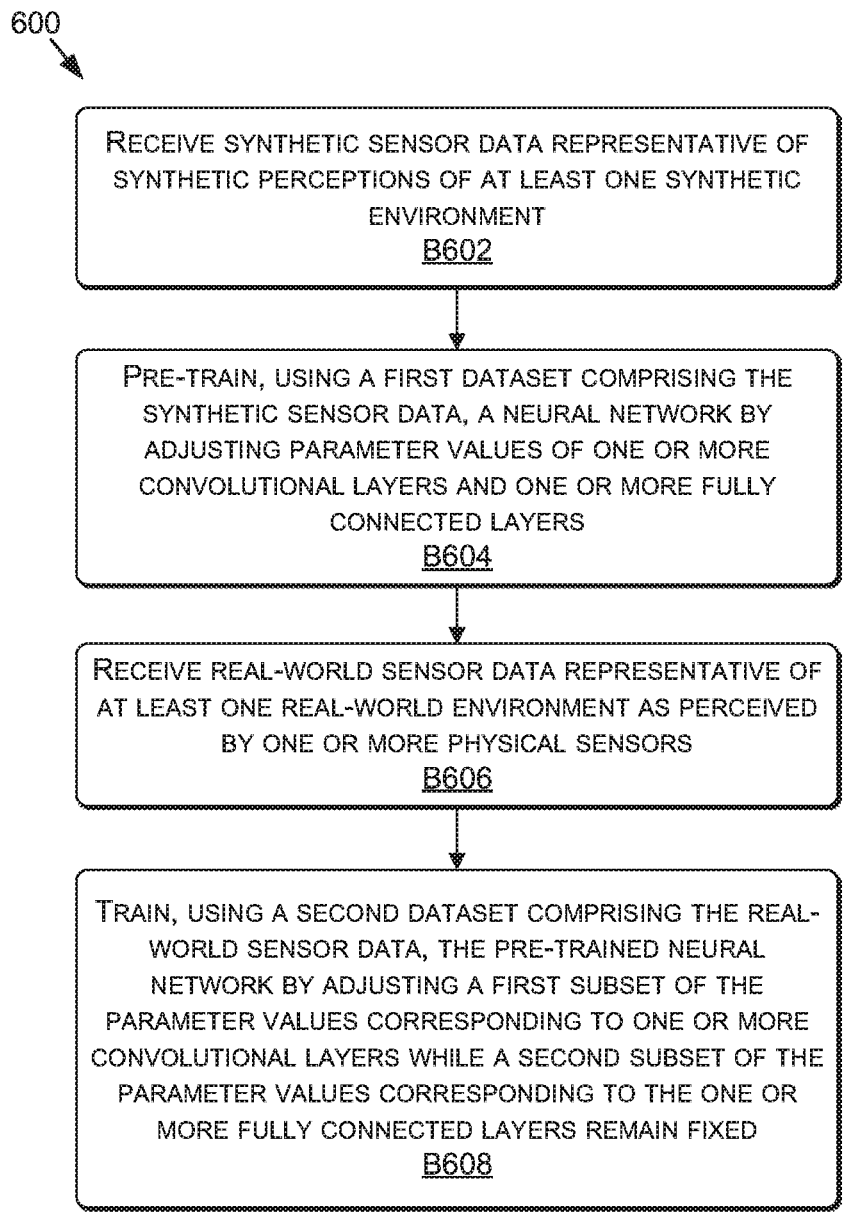
FIG. 6A is an illustration of a flow diagram including a method for training a neural network using synthetic image data, in accordance with some embodiments of the present disclosure.
Figure 6B:
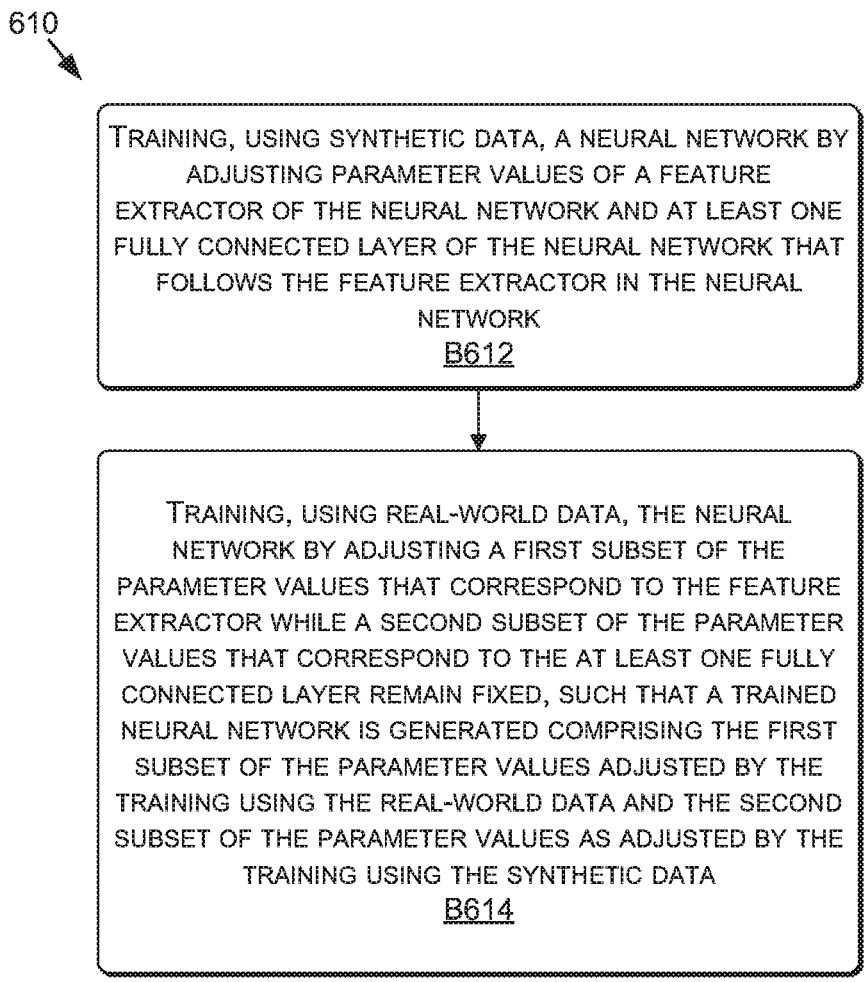
FIG. 6B is an illustration of a flow diagram including a method for training synthetic data, which may include synthetic image data or other types of synthetic data, in accordance with some embodiments of the present disclosure.

Now referring to FIGS. 6A and 6B, each block of method 600 and 610 (respectively) described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 600 and 610 are described, by way of example, with respect to the training system of FIG. 1, the deployed system 200 of FIG. 2, and/or the neural network 410 of FIG. 4. However, these methods may additionally or alternatively be executed by any one system, or any combination of systems, including, but not limited to, those described herein.

FIG. 6A is a flow diagram showing a method 600 for training a neural network, in accordance with some embodiments of the present disclosure. The method 600, at block B602, includes receiving synthetic sensor data representative of synthetic perceptions of at least one synthetic environment. For example, the training system 100, and more specifically the model pre-trainer 110, may receive the synthetic image training data 104. In some instances, the synthetic sensor data may include images automatically generated by a three-dimensional (3D) driving simulation software program and may include a 3D representation of the virtual environment having simulated 3D objects. For example, the images may be captured from a perspective of one or more virtual cameras within the 3D representation of the virtual environment.

In addition, the method 600, at block B604, includes pre-training, using a first dataset comprising the synthetic sensor data, a neural network by adjusting parameter values of one or more convolutional layers of the neural network and one or more fully connected layers of the neural network. The fully connected layers process features extracted using the one or more convolutional layers. The pre-training generates a pre-trained neural network comprising the parameter values adjusted by the pre-training. For example, the model pre-trainer 110 may use the synthetic image training data 104 to pre-train the pre-trained model 114. FIG. 4 also provides an illustration, in which the synthetic image training data 426 is used to pre-train the neural network 410 by updating parameters 450 of the convolutional layer(s) 423 and 425 (and possibly other layers of the feature extractor(s) 416) and by updating parameters 452 of the fully connected layer(s) 418 (e.g., all layers). In the example presented in FIG. 4, the one or more convolutional layer(s) 423 and 425 may precede the one or more fully connected layer(s) 418, and in some instances, the first subset of parameter values may correspond with each convolutional layer that precedes the fully connected layer(s) 418. Furthermore, in FIG. 4, the one or more fully connected layers may follow the one or more convolutional layer(s) 423 and 425, and in some instances, the second subset of parameter values may correspond to each fully connected layer of the fully connected layer(s) following the convolutional layer(s) 423 and 425.

The method 600, at block B606, includes receiving real-world sensor data representative of at least one real-world environment as perceived by one or more physical sensors. For example, the training system 100, and more specifically the model trainer 112, may receive the real-world image training data 106.

The method 600, at block B608, includes training, using a second dataset comprising the real-world sensor data, the pre-trained neural network by adjusting a first subset of the parameter values that correspond to the one or more convolutional layers while a second subset of the parameter values that correspond to the one or more fully connected layers remain fixed. The training is to generate a trained neural network. For example, the model trainer 112 may use the real-world image training data 106 to train the pre-trained model 114 resulting in the trained model 116. FIG. 4 also provides an illustration, in which the real-world training data 454 is used to train the pre-trained neural network 410 by only updating parameters 450 of the convolutional layer(s) 423 and 425 (and possibly other layers of the feature extractor(s) 416), while the parameters of the fully connected layer(s) 418 remain fixed. This training may generate a trained neural network, such as the trained model 214 in FIG. 2. The separation between the lower-level layers that are updated and the higher-level layers that are fixed may vary depending on the neural network and the task (e.g., focus or domain) being trained. For example, in some cases, the separation may fall directly after the last convolutional unit and before the first fully connected layer. In other cases, a separation may occur within the feature extractor(s) 416, such that parameters of some earlier convolutional units (e.g., 423) are updated, whereas parameters of later convolutional units (e.g., 425) and the fully connected layer(s) 416 remain fixed. In another example, the separation may occur within the fully connected layer(s) 418, in which case parameters of the feature extractor(s) 416 and one or more earlier fully connected layers are updated, while later fully connected layers remain fixed.

FIG. 6B is a flow diagram showing a method 610 for training a neural network, in accordance with some embodiments of the present disclosure. The method 610, at block B612, includes training, using synthetic data, a neural network by adjusting parameter values of a feature extractor of the neural network and at least one fully connected layer of the neural network that follows the feature extractor in the neural network. For example, in FIG. 4, the neural network 410 is trained by inputting the synthetic image training data 426 and by updating parameters 450 of the feature extractor(s) 416 and updating parameters 452 of the fully connected layer(s) following the feature extractor(s) 416 in the neural network 410. In executing the operation represented by block B612, the synthetic data may be synthetic image data (e.g., simulated image data) or may be other types of synthetic data (e.g., manually generated text, drawings, etc.), and the type of synthetic data may depend on the target of the neural network being trained (e.g., object detector, speech recognition, text recognition, etc.).

The method 610, at block B614, further includes training, using real-world data, the neural network by adjusting a first subset of the parameter values that correspond to the feature extractor while a second subset of the parameter values that correspond to the at least one fully connected layer remain fixed. As such, a trained neural network is generated comprising the first subset of the parameter values as adjusted by the training using the real-world data and the second subset of the parameter values as adjusted by the training using the synthetic data. For example, in FIG. 4, the real-world training data 454 may be input to the neural network 410 after the pre-training phase 412, and the neural network 410 is trained by updating parameters 476 of the feature extractor(s) 416, while parameters of the fully connected layer(s) 418 are fixed 478. Real-world data may include real-world image data or other types of real-world data, such as data from one or more sensors 538 of an autonomous vehicle.

Figure 7A:
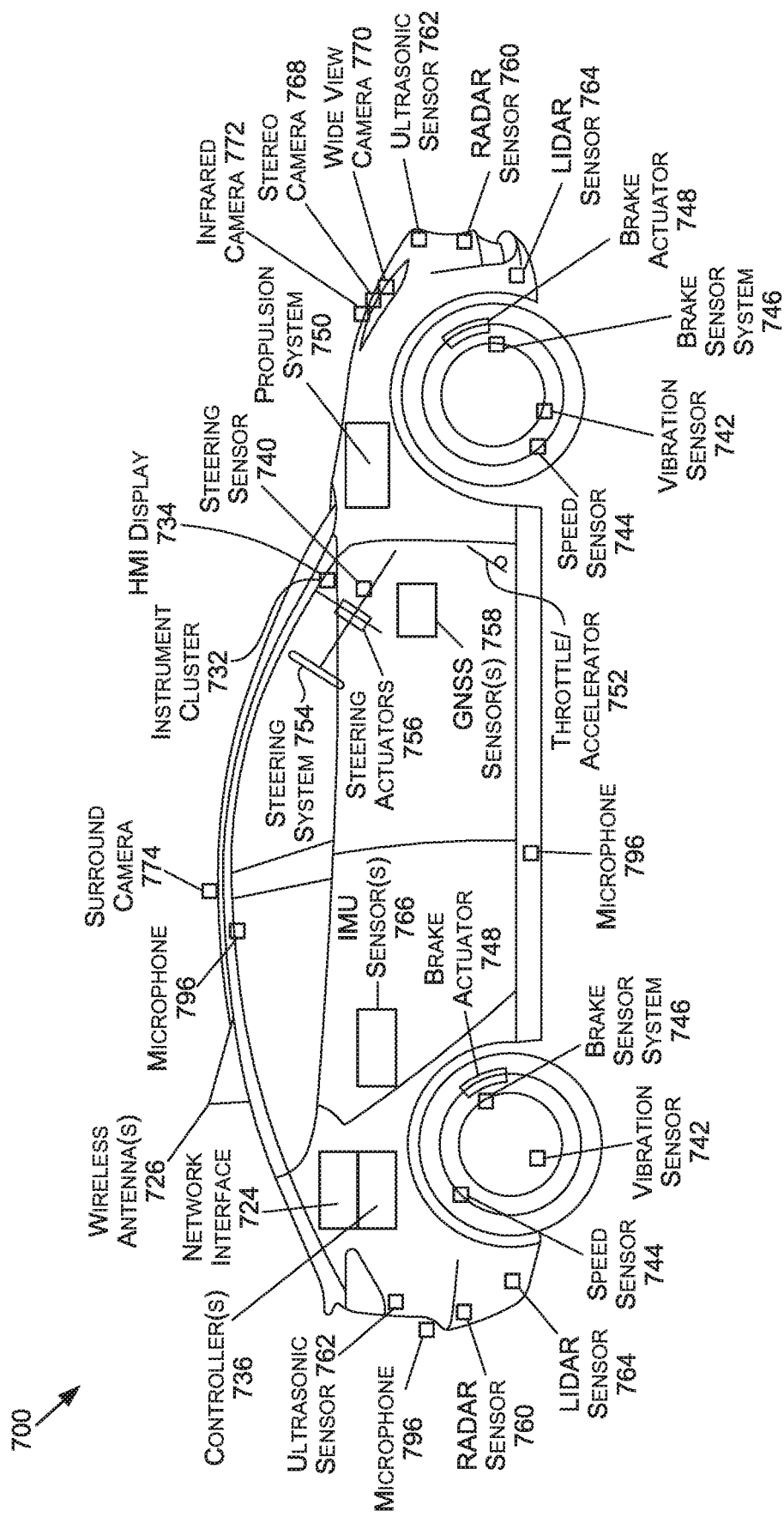
FIG. 7A is an illustration of an example autonomous vehicle, in accordance with some embodiments of the present disclosure.

FIG. 7A is an illustration of an example autonomous vehicle 700, in accordance with some embodiments of the present disclosure, and in some aspects, the autonomous vehicle may include the deployed system 200 of FIG. 2. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. For example, the vehicle 700 may be capable of conditional automation (Level 3), high automation (Level 4), and/or full automation (Level 5), depending on the embodiment.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. In some instances, the controller(s) 736 may correspond to the control manager 212 of FIG. 2 and may include a downstream component that receives the output or some additional information derived from the output of the trained model 214. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
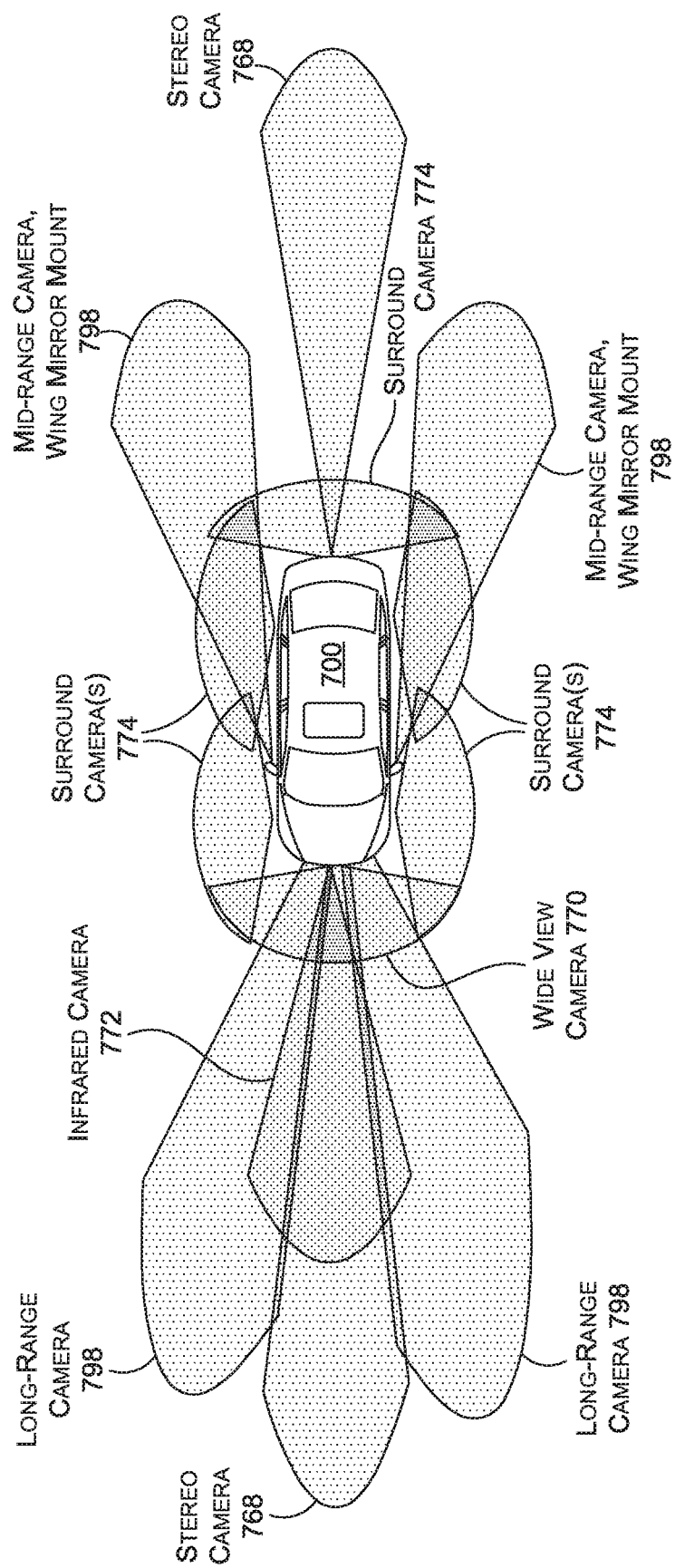
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700. In one aspect, one or more of the cameras described with respect to FIG. 7B may provide the real-world data 202 of FIG. 2 and/or the real-world image training data 106 of FIG. 1.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 720 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
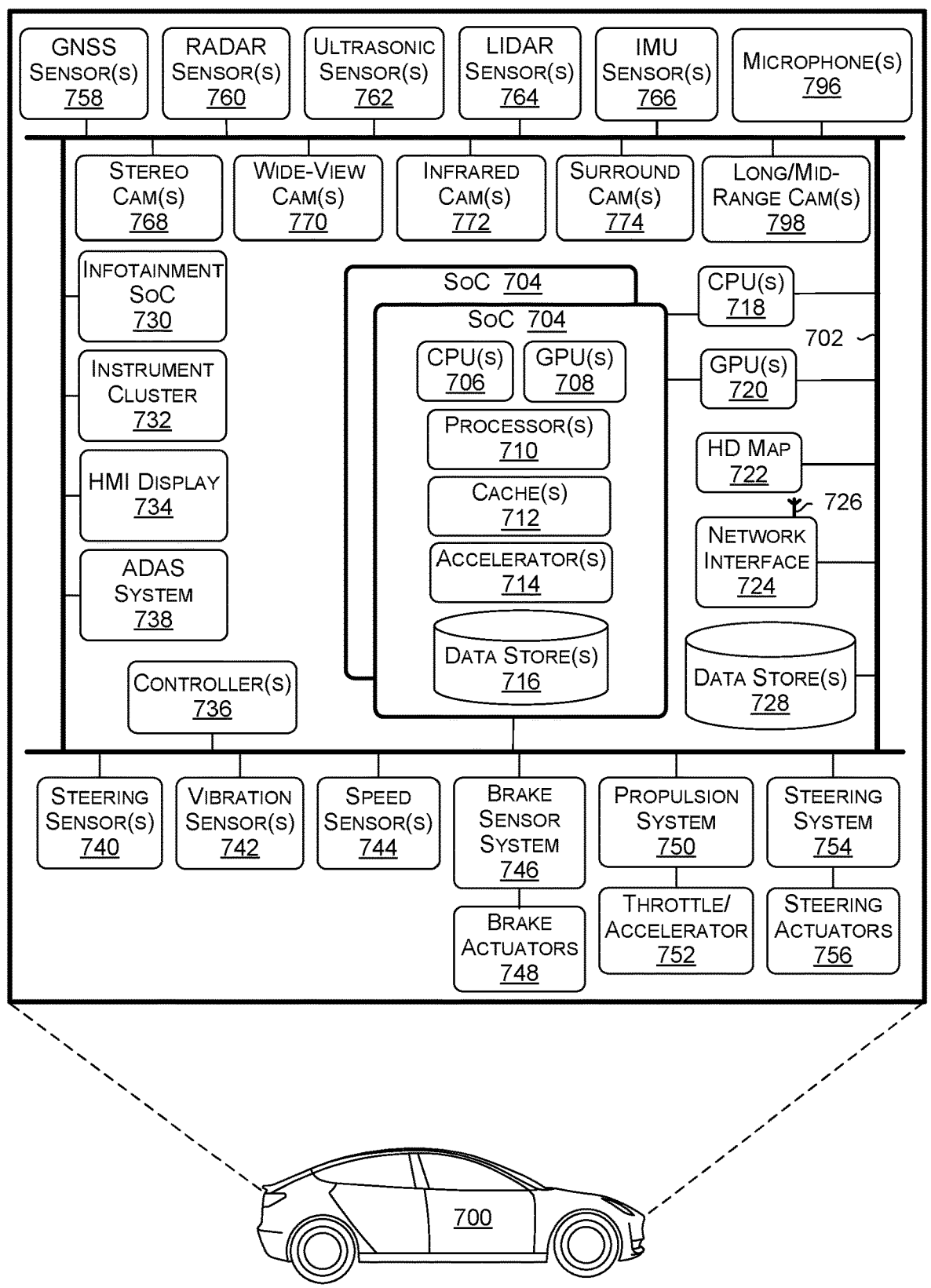
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like. In some aspects, the controller(s) 736 may correspond to the control manager 212.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA In some examples, the data store(s) 716 may be large enough in capacity to store multiple instances of neural networks for redundancy and safety. The data store(s) 716 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 720-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include an SoC, in some examples. The ADAS system 738 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
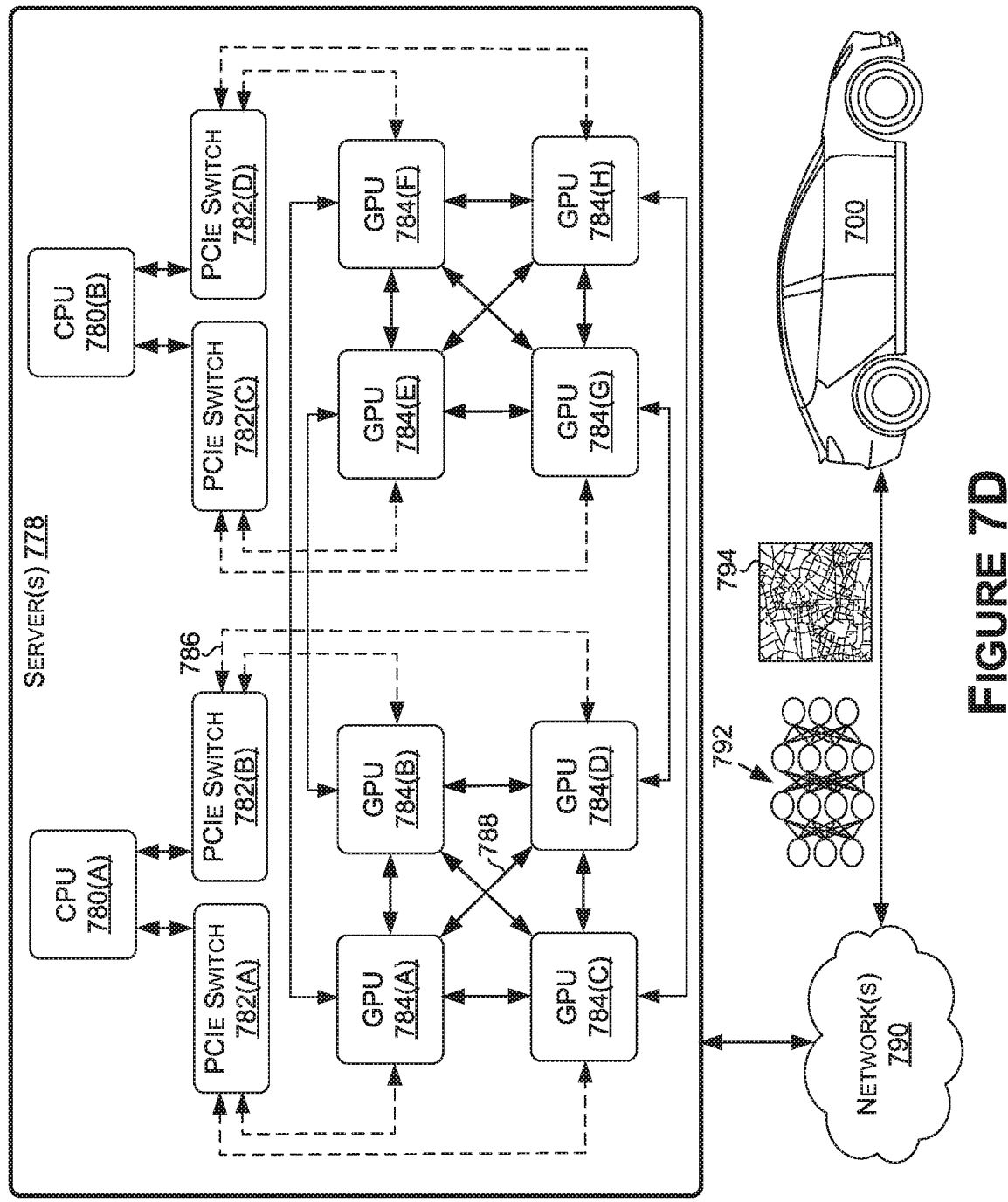
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(D) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. The computing device(s) 800 may be used to implement various components described with respect to some of the other figures of this disclosure, such as the training system 100 and/or the deployed system 200.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving synthetic sensor data representative of synthetic perceptions of at least one synthetic environment;
   pre-training, using a first dataset comprising the synthetic sensor data, a neural network by adjusting parameter values of one or more convolutional layers of the neural network and one or more fully connected layers of the neural network that process features extracted using the one or more convolutional layers to generate a pre-trained neural network comprising the parameter values adjusted by the pre-training;
   receiving real-world sensor data representative of at least one real-world environment as perceived by one or more physical sensors; and
   training, using a second dataset comprising the real-world sensor data, the pre-trained neural network by adjusting a first subset of the parameter values that correspond to the one or more convolutional layers while a second subset of the parameter values that correspond to the one or more fully connected layers remain fixed, the training generating a trained neural network.

2. The method of claim 1, wherein the trained neural network comprises the first subset of the parameter values as adjusted by the training and the second subset of the parameter values as adjusted by the pre-training.

3. The method of claim 1, wherein the one or more fully connected layers include each fully connected layer of the neural network.

4. The method of claim 1, wherein the one or more fully connected layers include each fully connected layer that follows the one or more convolutional layers of the neural network.

5. The method of claim 1, wherein the one or more convolutional layers include each convolutional layer of the neural network.

6. The method of claim 1, wherein the one or more convolutional layers include each convolutional layer that precedes the one or more fully connected layers of the neural network.

7. The method of claim 1, wherein the first dataset does not comprise real-world sensor data.

8. The method of claim 1, wherein the synthetic sensor data includes image data representative of at least one field of view of at least one virtual camera in a virtual environment.

9. The method of claim 1, wherein the real-world sensor data includes image data representative of at least one field of view of at least one physical camera.

10. The method of claim 1, wherein the second dataset includes augmented image data.

11. The method of claim 1, wherein the training is executed after the pre-training without any intervening training.

12. The method of claim 1, wherein the one or more convolutional layers comprise at least a portion of a feature extractor.

13. A method comprising:
    training, using synthetic data, a neural network by adjusting parameter values of a feature extractor of the neural network and at least one fully connected layer of the neural network that follows the feature extractor in the neural network; and
    training, using real-world data, the neural network by adjusting a first subset of the parameter values that correspond to the feature extractor while a second subset of the parameter values that correspond to the at least one fully connected layer remain fixed, wherein a trained neural network is generated comprising the first subset of the parameter values as adjusted by the training using the real-world data and the second subset of the parameter values as adjusted by the training using the synthetic data.

14. The method of claim 13, wherein the synthetic data includes image data representative of perceptions of at least one field of view of at least one virtual camera in a virtual environment.

15. The method of claim 13, wherein the real-world data includes image data representative of at least one field of view of at least one physical camera.

16. The method of claim 13, wherein the real-world data includes augmented image data.

17. A system comprising:
one or more processing devices and one or more memory devices communicatively coupled to the one or more processing devices storing programmed instructions thereon, which when executed by the one or more processing devices causes generation, using a neural network, of one or more commands for controlling an autonomous vehicle within a real-world environment, the neural network trained by:
receiving synthetic image data representative of simulated perceptions of at least one field of view of at least one virtual camera in at least one virtual environment;
pre-training, using the synthetic image data, the neural network by adjusting parameter values of one or more convolutional layers of the neural network and one or more fully connected layers of the neural network, that process features extracted using the one or more convolutional layers, to generate a pre-trained neural network comprising the parameter values adjusted by the pre-training;
receiving real-world image data representative of at least one field of view of at least one physical camera in at least one real-world environment; and
training, using the real-world image data, the pre-trained neural network by adjusting a first subset of the parameter values that correspond to the one or more convolutional layers while a second subset of the parameter values that correspond to the one or more fully connected layers remain fixed, the training generating a trained neural network.

18. The system of claim 17, wherein the real-world image data includes augmented image data.

19. The system of claim 17, wherein the real-world image data is representative of one or more out-of-domain artifacts.

20. The system of claim 17, wherein the one or more fully connected layers include each fully connected layer of the neural network, and wherein the one or more convolutional layers include each convolutional layer of the neural network.

* * * * *